United States Patent
Heuft et al.

(10) Patent No.: US 10,507,981 B2
(45) Date of Patent: Dec. 17, 2019

(54) DEVICE AND METHOD FOR DISCHARGING OBJECTS WITH A NON-ROTATIONALLY SYMMETRICAL BASE SURFACE

(71) Applicant: HEUFT SYSTEMTECHNIK GMBH, Burgbrohl (DE)

(72) Inventors: Bernhard Heuft, Burgbrohl (DE); Wolfgang Zappai, Burgbrohl (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 15/772,732

(22) PCT Filed: Nov. 7, 2016

(86) PCT No.: PCT/EP2016/076787
§ 371 (c)(1),
(2) Date: May 1, 2018

(87) PCT Pub. No.: WO2017/077099
PCT Pub. Date: May 11, 2017

(65) Prior Publication Data
US 2019/0210811 A1    Jul. 11, 2019

(30) Foreign Application Priority Data
Nov. 6, 2015  (DE) .......................... 10 2015 014 275

(51) Int. Cl.
*B65G 21/20* (2006.01)
*B65C 3/16* (2006.01)
*B65G 47/24* (2006.01)

(52) U.S. Cl.
CPC ............ *B65G 21/2072* (2013.01); *B65C 3/16* (2013.01); *B65G 21/20* (2013.01); *B65G 47/24* (2013.01)

(58) Field of Classification Search
CPC ...... B65G 47/24; B65G 47/244; B65G 21/20; B65G 21/2072; B65G 21/2063; B65C 3/16; B65C 9/04
USPC ........................................ 198/394, 416, 383
See application file for complete search history.

(56) References Cited

U.S. PATENT DOCUMENTS

| 3,038,584 | A | | 6/1962 | Lagsdin |
| 3,105,526 | A | * | 10/1963 | Hurtig ..................... B65B 43/60 141/171 |
| 3,142,371 | A | | 7/1964 | Rice et al. |
| 3,305,075 | A | * | 2/1967 | Johnson .................. B65B 35/22 198/721 |

(Continued)

FOREIGN PATENT DOCUMENTS

| DE | 1 246 526 B | 8/1967 |
| DE | 20 52 951 A1 | 5/1971 |

(Continued)

*Primary Examiner* — James R Bidwell
(74) *Attorney, Agent, or Firm* — Drinker Biddle & Reath LLP (57) ABSTRACT

A device and a method for discharging objects having an axially symmetrical base surface. The axially symmetrical base surface has the shape of regular polygon with a five-fold axial symmetry. The device comprises an aligning unit, a discharge unit, and a transport unit, on which the objects are conveyed in a single row and in a mutually spaced manner from the aligning unit to the discharge unit. At least one railing is provided on one side of the transport unit at least in the region of the aligning unit.

14 Claims, 5 Drawing Sheets

(56) References Cited

U.S. PATENT DOCUMENTS

| | | | |
|---|---|---|---|
| 3,495,441 A * | 2/1970 | Laub | G01M 3/3218 |
| | | | 198/394 |
| 3,643,781 A | 2/1972 | Risley et al. | |
| 3,666,082 A | 5/1972 | Riggs | |
| 3,669,244 A | 6/1972 | Pagdin et al. | |
| 4,321,994 A | 3/1982 | Heuft | |
| 4,356,908 A | 11/1982 | Embro, Jr. | |
| 4,369,873 A | 1/1983 | Heuft | |
| 4,464,884 A * | 8/1984 | Franks | B65B 59/02 |
| | | | 198/415 |
| 5,706,933 A | 1/1998 | Ouellette | |
| 5,816,029 A | 10/1998 | Sweeny | |
| 6,328,151 B1 | 12/2001 | Spangenberg et al. | |
| 7,207,444 B2 | 4/2007 | Heuft et al. | |
| 2003/0024650 A1 | 2/2003 | Ballarotti | |

FOREIGN PATENT DOCUMENTS

| | | | |
|---|---|---|---|
| DE | 3239541 * | 4/1984 | B65G 47/24 |
| DE | 10 2010 048 526 A1 | 4/2012 | |
| EP | 0 019 117 A1 | 11/1980 | |
| EP | 0 003 111 B1 | 6/1982 | |
| EP | 1 438 245 B1 | 8/2006 | |
| EP | 2 617 652 A1 | 7/2013 | |

\* cited by examiner

DEVICE AND METHOD FOR DISCHARGING OBJECTS WITH A NON-ROTATIONALLY SYMMETRICAL BASE SURFACE

CROSS-REFERENCE TO RELATED APPLICATIONS

This application is the U.S. national phase of the International Patent Application No. PCT/EP2016/076787 filed Nov. 7, 2016, which claims the priority benefit of German Application No. 10 2015 014 275.5 filed Nov. 6, 2015, the contents of all being incorporated herein by reference.

BACKGROUND

The present application is directed to a device for discharging objects such as containers, drums, packages with axially symmetrical base surfaces that are conveyed on a transport unit.

Such discharge devices are used, for instance, to remove faulty beverage bottles or other empty or already filled food containers or packaging. The transport unit can be a conveyor belt, chain link conveyor, or similar device. During the discharge process, the objects are usually pushed from a first transport unit onto a second transport unit running in parallel. Typical discharge devices can be operated even with bottle throughputs of up to 90000 bottles per hour. However, at such high speeds even minor irregularities can lead to tilting of objects and hence considerably restrict the productivity of the device.

In conventional discharge devices, the objects to be discharged are pushed onto a neighboring, parallelly running transporter by a transverse impetus, which is kept as small as possible. The transverse impetuses are kept as small as possible to minimize the risk of objects tipping over.

To keep the transverse impetus as small as possible, the discharge element can be controlled individually, such that the transverse impetus can be adjusted according to the nature of the object to be discharged. To do so, for instance, object parameters such as weight or the center of gravity of the objects to be discharge can be determined. The discharge element can then be selectively controlled on the basis of these parameters.

For objects with a rotationally symmetrical base surface, such as typically used cylindrical glass or returnable PET beverage bottles, tilting of the objects during discharge can be largely avoided in this way.

However, for typically used cylindrical, disposable PET beverage bottles, it turned out that, despite optimization of the control of the discharging device according to the above mentioned object parameters of the objects to be discharged, tilting of the objects to be discharged occurs relatively frequently. In particular, this is the case if the objects are to be discharged form one transport unit onto another transport unit and is further particularly the case, if the objects have to overcome a height difference during the discharge process.

SUMMARY

Hence, the objective of the present invention is to further improve the discharge process and to further reduce the risk of tilting of the objects to be discharged, in particular for objects to be discharged with a non-rotationally symmetrical base surface.

This objective is fulfilled in a device according to the present invention with the features of claim 1 as well as by a method with the features of claim 13.

The device for discharging objects, each having an axially symmetrical base surface, wherein the axially symmetrical base surface has the shape of a regular polygon with a three-, five-, or seven-fold axial symmetry, comprises an aligning unit, a discharge unit as well as a transport unit, on which the objects are conveyed in a single row and in a mutually space manner from the aligning unit to the discharge unit. At least one railing is provided on one side of the transport unit namely at least in the region of the aligning unit. The aligning unit is configured such that the objects are pushed against the railing, then roll off the railing, and thereby align themselves such that an axis of symmetry of the base surface extends in the transport plane perpendicularly to the railing. The objects are then transported to the discharge unit in this orientation. The discharge unit is oriented such that one of the corners of the base surface of the objects points in the direction in which the objects are discharged.

In one embodiment, the base surface of the objects consists of a closed support area. The closed support area can, for instance, have the shape of a regular polygon or a star with three, five, or seven corner vertices. In a preferred embodiment, the base surface of the objects consists of individual, mutually spaced, support areas. In this case, the axially symmetrical base surface is then understood to be the entire area formed by the individual support areas, wherein the support areas are then disposed at the respective vertices of a regular triangle, pentagon or heptagon. Preferably, the objects to be discharged possess a base surface in the shape of a regular triangle, pentagon or heptagon. Preferably, the objects to be discharged possess a base surface in the shape of a regular pentagon. Preferably, the base surface in the shape of a regular pentagon consists of five individual support areas.

Objects in the meaning of the present invention can be containers, such as glass bottles, plastic bottles, cans, drums or other packages. These terms are used in the present disclosure substantially synonymously. Reusable containers typically have a rotationally symmetrical base surface. In contrast, disposable containers often have a non-rotationally symmetrical base surface. In particular, disposable PET containers are commonly manufactured having a base surface consisting of five individual support areas. These are usually axially symmetrically disposed at the vertices of a regular pentagon. The present invention is also suitable for use in the discharge of objects with regular triangular or heptagonal base surfaces.

Beverage containers in particular often have a substantially cylindrically symmetrical shape, independent of the geometry of the base surface. Returnable beverage containers typically have a cylindrically symmetrical shape that extends usually along their entire height. They possess a cylindrically symmetrical body with rotationally symmetrical base surface. In contrast, disposable beverage containers often have a cylindrically symmetrical body with a non-rotationally symmetrical base surface. Typically, the cross-section of the container thereby transforms from an axially symmetrical base surface to a substantially rotationally symmetrical cross-section within a bottom region. This bottom region mostly extends over up to several centimeters and has a geometry, which corresponds to the geometry of the base surface.

The lateral railing of the present invention is configured such that it interacts with the axially symmetrical bottom region of the objects. If the objects display further sections, which have a cross-section corresponding to the geometry of the base surface, the railing can also interact with any of these further sections. In general, the peripheral segment of the objects interacting with the railing in order to align the objects is termed "axially symmetrical peripheral region" in this application.

In the present application, an area or a cross-section is referred to as "rotationally symmetrical" if a rotation around a point by any angle maps the area onto itself.

In the present filing, an area or a cross-section is referred to as "rotationally symmetrical" if it is mapped onto itself by a reflection in its axis of symmetry. An area or a cross-section can also have multiple axes of symmetry. An area or cross-section termed "axially symmetrical" in the present filing can also be an area which maps the area onto itself by a rotation around a point by defined angles. However, in this filing, the term "axially symmetrical" explicitly shall not include any rotationally symmetrical areas.

For the discharge of objects with an axially symmetrical but a non-rotationally symmetrical base surface, it has been shown that the discharge success also significantly depends on the orientation of the base surface. Surprisingly, it has been shown that tilting is least likely if the objects are discharged in such an orientation in which one corner of the base area points exactly in the direction in which the discharge should succeed. In this orientation, the discharge then succeeds along an axis of symmetry of the base area.

Single row and mutually spaced objects are usually conveyed on a transporter with bilaterally provided railings. The objects alternately come into contact with one of the two railings. Hence, by frictional contact with the railing, the objects are set in rotation, one time in a clockwise and another time in an anticlockwise direction, such that the orientation changes continuously. If controlled rotation of the objects is to be achieved, measures have to be taken so that the objects only roll off a single railing.

According to one embodiment of the invention, the railing, at which the objects should roll off in the region of the aligning unit, is disposed at an acute angle relative to the original transport direction of the transport unit. The objects conveyed by the transport unit are softly pushed against and roll off the obliquely disposed railing due to stiction between their base surface and the transport unit. The wider the angle at which the railing is disposed, the bigger is the pushing force with which the objects are pressed against the railing. Generally, the angle can be chosen arbitrarily and can be adjusted according to the transport objective. It has been found to be particularly advantageous that even an angle below 5° and, further preferred, an angle between 1° and 3°, is sufficient to apply the necessary pushing force. At this inclination, sufficiently long aligning units can be provided without increasing the width of the transport unit.

This embodiment is technically particularly easy to achieve, as no additional components and also no adjustment of the other components are required.

However, pushing the objects against the railing can also be achieved in a different way. For example, the railing can be disposed in parallel to the transport unit, but the transport unit can be slightly tilted, such that the container is pushed against the railing due to the slope descending force.

In a further embodiment, a pushing unit can be provided which pushes the objects softly against the railing. Such a pushing unit can, for instance, be a brush unit, fixed on the opposite side of the railing and pushing the single objects with its bristles softly against the railing. Thereby, the unit has to be chosen such that the objects can still roll off the railing.

For the function of the aligning unit, the provision of a railing on one side of the transport unit is sufficient. To increase operational safety, a railing can also be provided on the other side of the transport unit.

The length of the aligning unit is preferably adjustable to the transport objective. As the objects usually only have to rotate by a part of their perimeter, it is in many cases sufficient if the length of the aligning unit corresponds approximately to the perimeter of the object.

The railing can generally have any arbitrary shape as long as it is shaped such that it interacts with the object segment that has a cross-section which corresponds to the geometry of the base surface of the object. Preferably, the railing is configured in a rail-shaped form and is fixed at the height of the axially symmetrical peripheral segment of the object to be transported. The vertical extend of the bottom region can vary between object types such that the railing is preferably adjustably configured, and is both vertically as well as horizontally movable to adjust it to the geometry of the object to be transported.

Further preferably, the railing is configured of multiple elements, for example, at least of two rails. A first rail, also referred to as aligning rail, is disposed at the height of the axially symmetrical peripheral region of the object. Because the axially symmetrical peripheral region of the object is usually the bottom region of the objects, the aligning rail is mostly disposed only a few millimeters above the transport unit. With such low railing rails, there is always a risk of the objects tipping over the rail of the transport unit. To avoid such a tipping over of the objects, it is advantageous to provide an additional rail, also referred to as guide rail. The guide rail is preferably disposed at the height of one of the rotationally symmetrical peripheral regions. For typical objects to be transported, the guide rail is fixed at around the height of the center of the object.

The guide rail is preferably disposed in parallel to the aligning rail. Preferably, the guide rail is disposed laterally offset relative to the aligning rail. The lateral offset of the guide rail depends on the perimeter of the objects. Preferably, the lateral offset is chosen such that the objects only come into contact with the guide rail when the objects are in the desired discharge orientation. It is also possible to use multiple guide rails.

Of course it is also possible to provide a conventional railing on the second side of the transport unit, to avoid tipping over of the object on this side of the transport unit.

Figure 1:
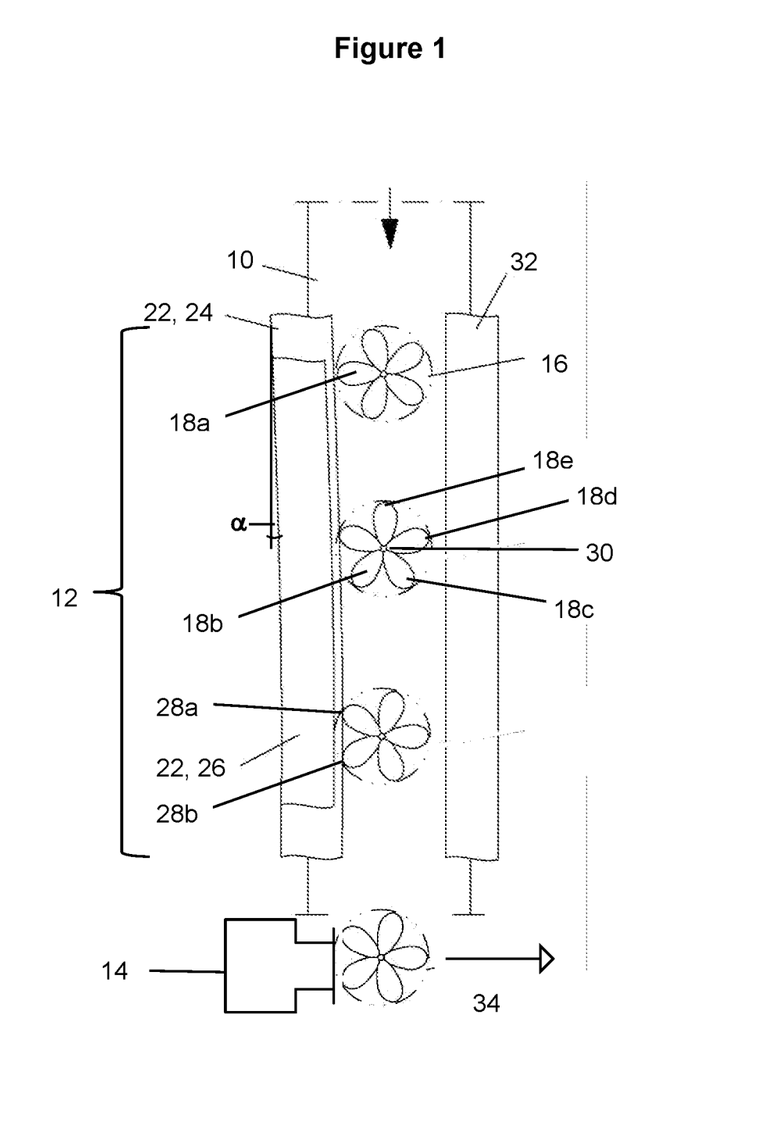
FIG. 1 a top view of a discharge unit according to the invention.

The objects orient themselves in the alignment unit autonomously, as is disclosed in the following section. The objects are conveyed from a transport unit to the aligning unit as illustrated in FIG. 1. In the region of the aligning unit, the objects come into contact with the guide rail, which is disposed obliquely relative to the original transport direction. In general, the objects have such an orientation that there is one contact point between the object and the aligning rail. At this contact point the object rolls off the guide rail until a second contact point comes into contact with the aligning rail as indicated in FIG. 1. For typically used objects, this position already corresponds to the desired discharge orientation. In this orientation, an axis of symmetry of the base surface is perpendicular to the aligning rail. Furthermore, in this orientation, the distance between the center of the object and the aligning rail is at a minimum, such that only in this position the guide rail can come into contact with the object. Once the object is in this orientation, a further rotation of the object is suppressed. A further rotation of the object would mean that the center of the object would have to be moved further away from the aligning rail again. This is counteracted by the pressure with which the object is pushed against the aligning rail. Hence, the object remains in this orientation and is conveyed in this orientation towards the discharge unit.

The discharge unit can be any arbitrary discharge unit known to the skilled person. To his end typically ejectors or pushers are used, which are disposed perpendicularly to the transport unit and transfer lateral momentum onto the object to be discharged. Due to the lateral impetus, the object to be discharged is pushed from the transport unit, for example, onto a second, parallelly running transport unit. In particular, if there are minor height differences between the transport units, there is an increased risk for the objects to tilt. Instead of a pusher, other discharge units such as disclosed in patents EP 0 003 111 B1, EP 0 019 117 B1 or EP 1 438 245 B1 can be used too.

The present invention is also directed to a method for discharging objects having an axially symmetrical base surface, wherein the axially symmetrical base surface has the shape of a regular polygon with a three-, five- and seven-fold axial symmetry. The method comprises conveying the objects on a transport unit, aligning the objects conveyed by the transport unit using an aligning unit and discharging the aligned objects using a discharge unit. The objects are conveyed in a single row and in a mutually space manner from the aligning unit to the discharge unit. The transport unit is provided with a lateral railing disposed at least in the region of the aligning unit, wherein the aligning unit is configured such that the objects are pushed against the lateral railing and are thereby aligned such that an axis of symmetry of the axially symmetrical base surface of the objects extends in the transport plane perpendicularly to lateral railing. The aligning direction is thereby oriented such that one of the corners of the base surface of the objects points in the direction in which the objects are to be discharged.

The discharge unit is preferably a pusher, disposed on the same side as the lateral railing and pushing the aligned objects perpendicularly to the transport direction off the side of the transport unit opposite of the pusher. Thereby, the objects can, for instance, be pushed onto another transport unit or into a collection area.

Features, disclosed in the context of the individual embodiments, can, as long as nothing else is specified, also be implemented in the context of other embodiments.

BRIEF DESCRIPTION OF THE DRAWINGS

Embodiments of the invention are subsequently illustrated with the help of the drawings.

DETAILED DESCRIPTION

Figure 2:
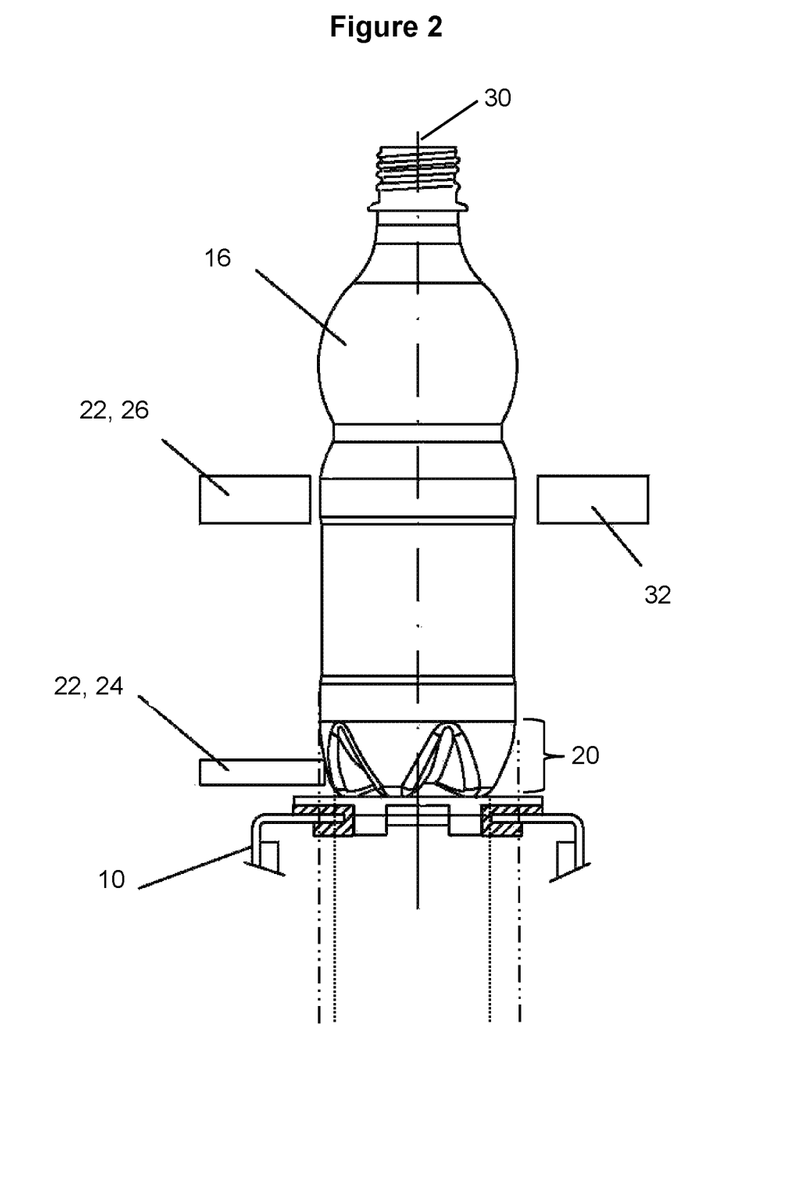
FIG. 2 side view in the direction of transport of the bottle shown in FIG. 1 at the start of the aligning unit.
Figure 3:
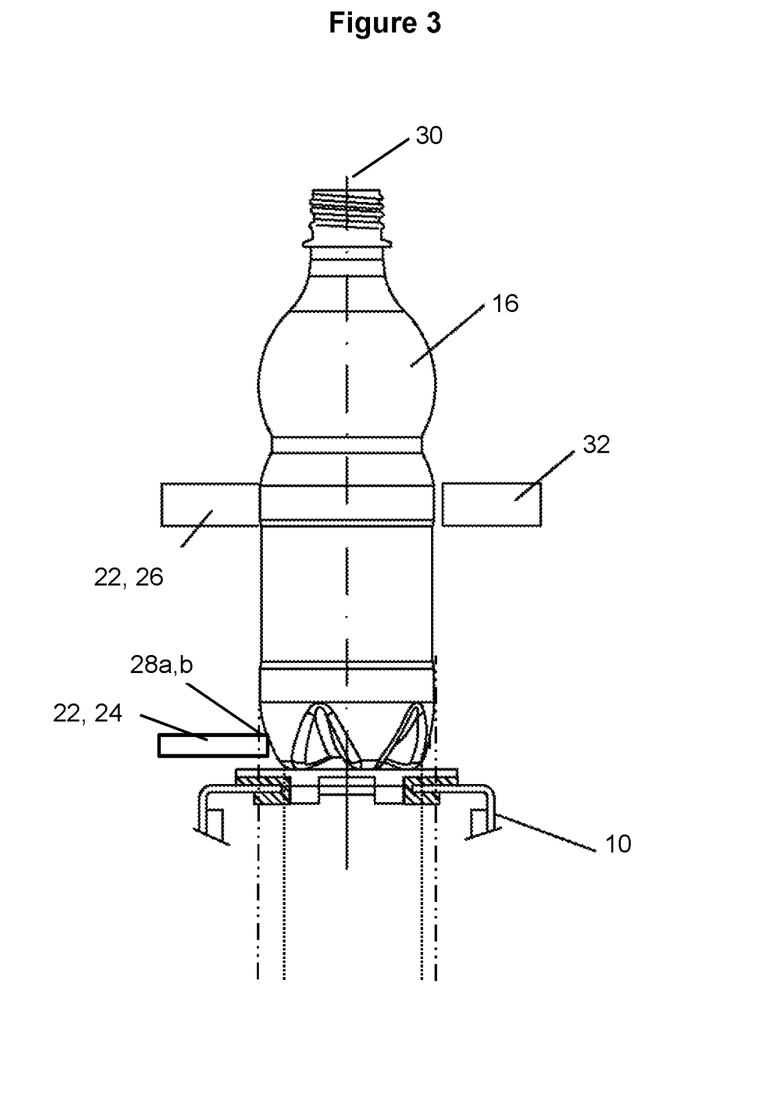
FIG. 3 side view in the direction of transport of the bottle shown in FIG. 1 at the end of the aligning unit.
Figure 4:
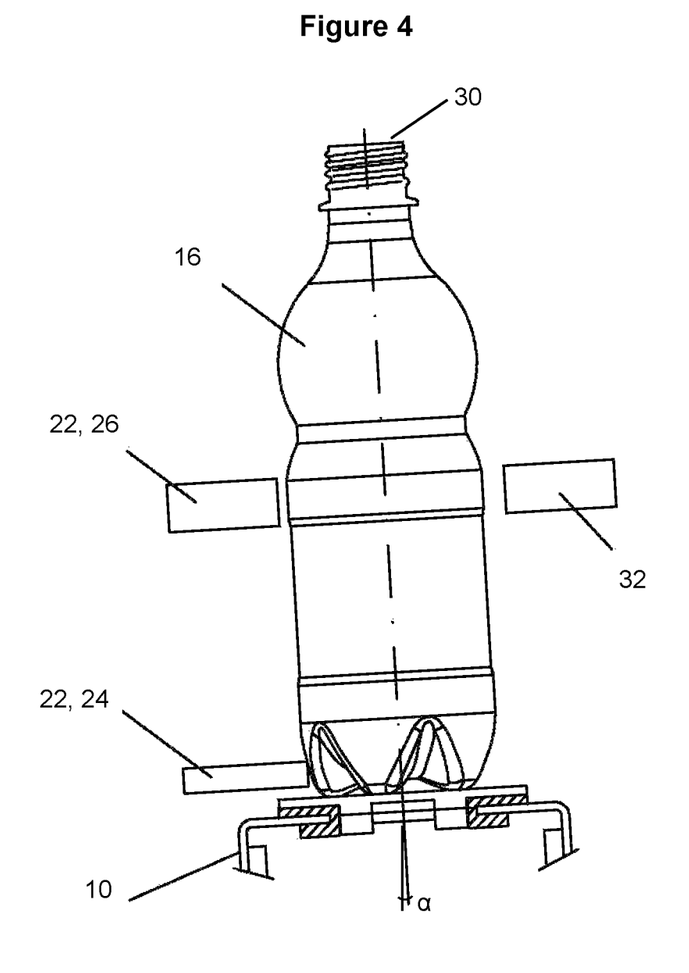
FIG. 4 is side view showing the tilting of the transport unit.
Figure 5:
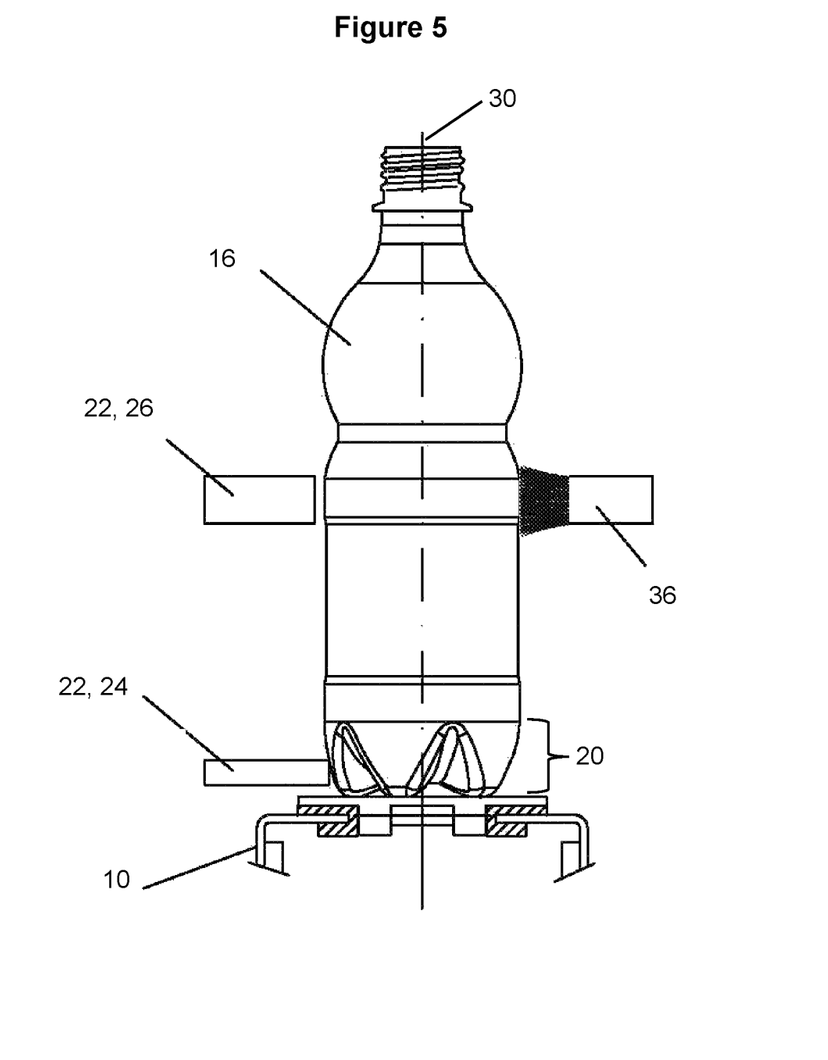
FIG. 5 is a side view showing a pressing unit 36.

FIG. 1 shows an embodiment of the discharge unit comprising a transport unit 10, an aligning unit 12 and a discharge unit 14. Objects 16 are transported on the transport unit. As indicated by the dashed circle, the objects 16 are substantially cylindrically shaped and hence rotationally symmetrical. In contrast, the base surface 18 of the objects 16 is not rotationally symmetrical, but axially symmetrical with a five-fold axis of symmetry. This is indicated by the club-shaped, solid line structures. For instance, the objects 16 can be typically used disposable PET bottles, where their base surface is formed by five symmetrically disposed support areas 18a,b,c,d,e. Thereby, the individual support areas 18a,b,c,d,e are oriented in the shape of a regular pentagon. As can be seen from the cross-sections of FIGS. 2 and 3, the individual support areas 18a,b,c,d,e do not usually extend to the outer periphery of the bottles 16, but are disposed slightly offset towards the center of the bottle. The pentagonal disposition of the base surface 18 also still continues within the bottom region 20 of the bottle 16, wherein the bottle cross-section within this bottom region 20 successively transforms from the axially symmetrical pentagonal shape of the base surface 18 into a rotationally symmetrical circular cross-section of the bottle.

Surprisingly, it has been found that for the bottles 16 with a non-rotationally symmetrical base surface 18, the success of the discharge process significantly depends on the orientation of the base surface 18 of the bottles 16 during the discharge process. For typically used disposable PET bottles 16 with base surfaces 18 with a five-fold axial symmetry, as shown in FIG. 1, tilting of the bottles 16 during the discharge procedure is most likely to be avoided, if the base surface 18 is oriented such that one of the five support areas 18a,b,c,d,e points into the direction in which the bottles 16 are to be discharged during the discharge process. The bottle 16, shown in FIG. 1 in the region of the discharge unit, is already in the optimum orientation for discharge. In this alignment one of the axes of symmetry of the base surface 18 of the bottle 16 extends perpendicularly to the provided railing 22 in the region of the aligning unit.

To convey the bottles 16 to the discharge unit 14 in the desired orientation, an aligning unit 12 as shown in FIG. 1 can be used. The aligning unit 12 substantially consists of a two-part rail-shaped railing 22, which is disposed at an acute angle α of approximately 1-2° relative to the transport unit 10 at the, in conveying direction, right edge of the transport unit 10. By frictional contact between the transport unit 10 and base surface 18 of the bottles 16, every bottle 16 is softly pushed against the railing 22, disposed obliquely relative to the transport unit 10.

The two-part railing 22 comprises a first rail, aligning rail 24, which is disposed at the height of the axially symmetrical bottom region 20 of the bottles 16. Furthermore, to avoid tilting of the bottles 16, a second rail, guide rail 26, is provided. The guide rail 26 is mounted approximately at the height of the center of the bottle 16 in a region where the bottles 16 have a rotationally symmetrical cross-section. In addition, the guide rail 26 is disposed slightly offset towards the outer edge of the transport unit 10 such that in the orientation shown in FIG. 2, only the bottom region 20 comes into contact with the aligning rail 24 of the railing 22. As shown in FIG. 1, the bottle 16 subsequently rolls off the aligning rail 24 at the contact point 28a between the first support area 18a and the aligning rail 24, until the second support area 18b also comes into contact with the aligning rail 24. Further rotation of the bottle 16 could then only take place at the second contact point 28b between the aligning unit 24 and the second support area 18b. However, such (further) rotation is suppressed by the continuous frictional pressure, pressing every bottle 16 against railing 22, of the transport unit 10.

Due to the non-rotationally symmetrical shape of the bottom region 20 of the individual bottles 16, the distance from the guide rail 26 to the rotational axis 30 of the bottles 16 depends on the orientation of the bottles 16. The distance between the rotational axis 30 of the bottles and the guide rail 26 is largest in the orientation of the bottle 16 shown near the upper edge of the figure. With increasing rotation of the bottle 16, this distance decreases. The distance between the rotational axis 30 of the bottles 16 and the guide rail 26 is smallest when both contact points 28a and 28b in the bottom region 20 of the bottle 16 touch the aligning rail 24; i.e. when the bottles are in the desired discharge orientation. Hence, the lateral distance of the guide rail 26 is preferably set such that the bottle 16 touches the guide rail, only when it is in the desired discharge orientation. In this way, tilting of the bottles 16 during the discharge process is effectively suppressed.

At the side of the transport unit and opposite the aligning unit, another railing 32 is provided. This railing does not serve to align the bottles, but should only suppress that bottles tip off this side of the transport unit.

As disposable PET bottles in particular can have a plurality of different shapes, it is useful to configure the individual rails 24, 26, 32 movably, such that their position can be adjusted according to the respective present transport objective.

The railing 22 of the aligning unit 12 extends to the discharge unit 14. A bottle 16 to be discharged is conveyed to the discharge unit 14 in the desired discharge orientation. In the embodiment shown in FIG. 1, the discharge unit is a conventional pusher, which gives a transverse impetus to the bottle 16 to be discharged, such that the bottle is pushed laterally off the transport unit 10. The discharge unit 14 is coupled to a control unit and may be individually con-trolled according to previously determined object parameters. For instance, the objects to be discharged may be pushed onto a second transport unit (not shown). As the orientation of the bottle 16 to be discharged, as shown in FIG. 1, is such that the support area 18a,b,c,d,e of the base surface of the bottle points in the direction of discharge, the stance of the bottle 16 is as stable as possible and the risk of tilting of the bottle 16 is reduced.

The disclosed principle for the alignment of the bottles 16 to be discharged may of course also be used with bottles 16 with base surfaces 18 having an axis of symmetry different than five-fold.

LIST OF REFERENCE MARKS

10 Transport unit
12 Aligning unit
14 Discharge unit
16 Bottle
18 Base surface
18a,b,c,d,e Support area
20 Bottom region of the bottle
22 Railing
24 Aligning Rail
26 Guide Rail
28a,b Contact point
30 Rotational axis of the bottle
32 Guide rail
34 Direction of discharge

The invention claimed is:

1. A device for discharging objects each having an axially symmetrical base surface, wherein the axially symmetrical base surface has the shape of a regular polygon with a three-, five-, or seven-fold axial symmetry, comprising:
an aligning unit,
a discharge unit,
a transport unit, on which the objects are conveyed in a single row and in a mutually space manner from the aligning unit to the discharge unit, and
at least one railing arranged on one side of the transport unit at least in the region of the aligning unit,
wherein the aligning unit is configured such that the objects are pressed against the railing and are thereby aligned such that an axis of symmetry of the base surface in the transport plane extends perpendicularly to the railing and wherein the objects are then transported to the discharge unit in this orientation,
wherein the discharge unit is configured to push the objects to be discharged onto a neighboring, parallelly running transporter by a transverse impetus,
and wherein the discharge unit is oriented such that a corner of the base surface of the objects points in the direction in which the objects are discharged.

2. The device according to claim 1, wherein the objects in the region of the aligning unit are pressed against the railing by disposing the railing at an acute angle relative to the direction of transport of the transport unit.

3. The device according to claim 1, wherein the objects are pressed against the railing by tilting the transport unit in the region of the aligning unit.

4. The device according to claim 1, wherein the objects are pressed against the railing in the region of the aligning unit by a pressing unit.

5. The device according to claim 1, wherein the railing is configured in a rail-shaped form.

6. The device according to claim 1, wherein the objects have at least one peripheral region with an axially symmetrical cross-section corresponding to the base surface and wherein the rail-shaped railing comprises at least one aligning rail, fixed at the height of the axially symmetrical peripheral region of the objects.

7. The device according to claim 6, wherein the axially symmetrical peripheral region of the objects is disposed at the height of a bottom region of the objects, and the aligning rail is exclusively disposed at the height of the axially symmetrical peripheral region of the objects.

8. The device according to claim 6, wherein the objects are essentially pressed against the aligning rail of the railing, only.

9. The device according to claim 1, wherein the objects have a rotationally symmetrical peripheral region, and wherein the rail-shaped railing comprises at least one guide rail, fixed at the height of the rotationally symmetrical peripheral region of the objects.

10. The device according to claim 9, wherein the aligning rail and the guide rail are parallel to each other, but disposed laterally offset relative to the transport unit, such that the objects are guided along the guide rail only when the objects have adopted the desired orientation.

11. The device according to claim 1, wherein the objects to be discharged have a base surface in the shape of a regular pentagon, and wherein the base surface preferably consists of five individual support areas.

12. The device according to claim 1, wherein the objects to be discharged are plastic bottles, preferably disposable PET bottles, having a cylindrically symmetrical body and a base surface and a contiguous bottom region, wherein the base surface and the bottom region respectively possess the shape of a regular pentagon.

13. A method for discharging objects with an axially symmetrical base surface, wherein the axially symmetrical base surface has the shape of a regular polygon with a three-, five-, or seven-fold axial symmetry, comprising the following steps:

conveying the objects on a transport unit;

aligning the objects conveyed on the transport unit using an aligning unit; and     discharging the aligned objects using a discharge unit, wherein the objects are conveyed on the transport unit in a single row and in a mutually space manner from the aligning unit to the discharge unit, and wherein the transport unit is provided with a lateral railing at least in the region of the aligning unit,     wherein the aligning unit is configured such that the objects are pressed against the lateral railing and are aligned in the process such that an axis of symmetry of the axially symmetrical base surface of the objects extends on the transport plane perpendicularly to lateral railing,     wherein the discharge unit is configured to push the objects to be discharged onto a neighboring, parallelly running transporter by a transverse impetus,     and wherein the aligning unit is oriented such that a corner of the base surface of the object points in the direction in which the objects are discharged.

14. The method according to claim 13, wherein the aligning unit is preferably a pusher, disposed on the same side as the lateral railing, and which pushes the oriented objects substantially perpendicularly to the transport direction off the side opposite of the pusher of the transport unit.

* * * * *